Figure 1:
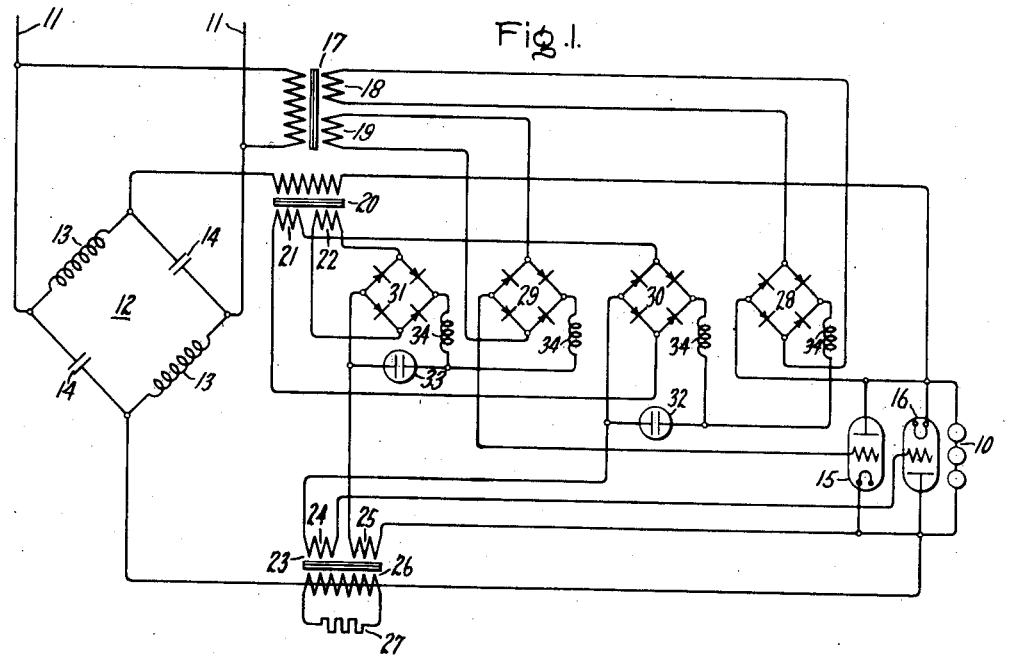

Feb. 9, 1932. H. D. BROWN ET AL 1,844,633

CONSTANT CURRENT TRANSLATING CIRCUITS

Filed June 22, 1931

Inventor:
Herbert D. Brown,
Camil A. Sabbah,
by Charles E. Tullar
Their Attorney.

Patented Feb. 9, 1932

1,844,633

UNITED STATES PATENT OFFICE

HERBERT D. BROWN AND CAMIL A. SABBAH, OF SCHENECTADY, NEW YORK, ASSIGNORS TO GENERAL ELECTRIC COMPANY, A CORPORATION OF NEW YORK

CONSTANT CURRENT TRANSLATING CIRCUITS

Application filed June 22, 1931. Serial No. 546,062.

Our invention relates to constant current electric translating circuits and more particularly to such circuits adapted to transmit energy from a substantially constant potential alternating current source to a constant current variable potential load circuit.

Heretofore it has been proposed to transmit energy from a constant potential alternating current source to a constant current load circuit by means of a monocyclic square comprising a bridge circuit made up of capacitors and reactors connected alternately in series. Such circuits are particularly useful in connection with street lighting systems in which a variable number of illuminating units are connected in series and form a load circuit. With such an arrangement it is necessary to maintain substantially constant current in the load circuit although the potential of the load circuit will vary with the number of units contained therein. In circuits utilizing the monocyclic square, however, it has been found that the load current varies with variations in the potential of the supply circuit which, in certain cases, is undesirable. In addition it is a well known fact that the load voltage will rise to destructive values in case of an accidental interruption of the load circuit.

It is an object of our invention, therefore, to provide an improved constant current translating circuit utilizing a monocyclic square which will overcome the above mentioned disadvantages of the arrangements of the prior art and which will be simple and reliable in operation.

It is another object of our invention to provide an improved constant current translating circuit utilizing a monocyclic square in which the load current will be maintained substantially constant irrespective of changes in the potential of the alternating current supply circuit.

It is a further object of our invention to provide an improved constant current electric translating circuit utilizing a monocyclic square in which the load circuit and its associated apparatus will be protected from destructive voltages in case of an accidental interruption of the load circuit.

In accordance with our invention a constant current load circuit is connected to a constant potential supply circuit through a monocyclic square and the load circuit is shunted by a pair of electric valves reversely connected in parallel. Each of the electric valves is provided with a control grid which is energized from a grid circuit including three components of potential, (1) a unidirectional potential variable in magnitude in accordance with variations in the potential of the supply circuit, (2) a unidirectional potential derived from the load current but substantially constant in magnitude for normal variations therein and (3) an alternating potential variable in accordance with variations in the load current and displaced in phase with respect to the potential of the load circuit. These three components of grid potential combine so that the electric valves normally short circuit the load for a small final portion of each half cycle of positive anode potential, this portion varying in accordance with variations in the potential of the supply circuit so as to maintain the effective load current substantially constant. In case the load circuit becomes accidentally interrupted, the only control potential remaining is that variable in accordance with the potential of the supply circuit, which tends to maintain the electric valves fully conductive, thus short circuiting the monocyclic square and protecting the load circuit from disruptive voltage.

Figure 2:
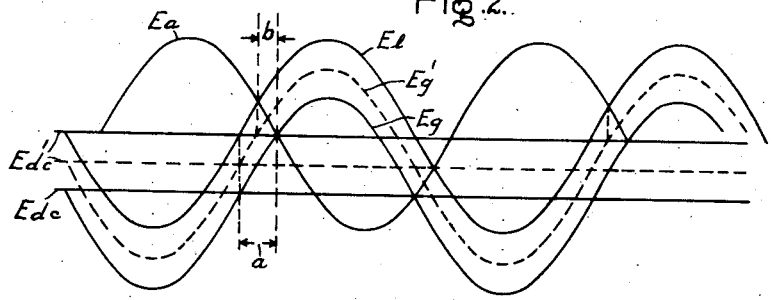

For a better understanding of our invention, together with other and further objects thereof, reference is had to the following description taken in connection with the accompanying drawings and its scope will be pointed out in the appended claims. Fig. 1 of the accompanying drawings is a diagrammatic illustration of one embodiment of our invention while Fig. 2 comprises a series of curves to aid in the understanding thereof.

Referring now to Fig. 1 of the drawings, we have illustrated an arrangement for energizing a constant current load device 10 from a substantially constant potential alternating current circuit 11 through a monocyclic square 12. As will be well understood by those skilled in the art, this square 12 comprises a bridge circuit having opposite arms consisting of reactors 13 and capacitors 14. The load circuit 10 is shunted with a pair of electric valves 15 and 16 reversely connected in parallel. Each of the valves 15 and 16 is provided with an anode, a cathode and a control grid and is preferably of the vapor electric discharge type. In order to control the grids of electric valves 15 and 16 as outlined above, there is provided a potential transformer 17 having a primary winding energized from the supply circuit 11 and a pair of secondary windings 18 and 19, and current transformers 20 and 23 connected in series with the load circuit 10 and provided with secondary windings 21 and 22 and 24 and 25, respectively. Transformer 23 is preferably provided with a tertiary winding 26 connected in circuit with a register 27, or its leakage reactance may be adjusted, or both, so that the potentials supplied by the windings 24 and 25 will be displaced in phase with respect to the potential of the load circuit 10. The windings 18, 19, 21 and 22 are connected across the input diagonals of rectifiers 28 to 31, inclusive. These rectifiers may be any of the several types well known in the art, although I have shown by way of example rectifier bridges made up of contact rectifier elements. Across the rectifiers associated with the windings 21 and 22 are connected constant potential devices, such as glow lamps 32 and 33, respectively. In series with the direct current side of each of the rectifiers 28 to 31 is included in reactor 34 in order to smooth out the unidirectional potential obtained from these rectifiers. The grid potentials of the valves 15 and 16 comprise three components; (1) a unidirectional potential proportional to the line voltage of the circuit 11 derived from the rectifiers 28 and 29; (2) a unidirectional potential substantially constant in magnitude for normal variations in the current supplied to the load device 10 and derived from the rectifiers 30 and 31, and (3) an alternating potenial displaced in phase with respect to the potential of the load circuit 10 and derived from the windings 24 and 25. These components are combined by connecting each of the windings 24 and 25 in series with the direct current side of a rectifier associated with one of the windings of each of the transformers 17 and 20, as clearly shown in the drawings. Each pair of rectifiers is connected in opposition so that only the difference in their potentials appears in the grid circuits of the valves 15 and 16.

The manner in which the monocyclic square 12 operates to convert the constant potential alternating current into constant alternating current of variable potential is well understood by those skilled in the art, so that a detailed explanation is not deemed necessary. The operation of electric valves 15 and 16 and their associated control circuits to effect the operation described above will be understood more clearly by reference to the curves of Fig. 2 in which the curve $E_a$ represents the anode potential of one of the electric valves, for example, the valve 15; the curve $E_1$ represents the potential of the winding 25 which varies in magnitude in accordance with the load current of the circuit 10 and is displaced in phase with respect to the potential of the load circuit by the angle $a$; the line $E_{dc}$ represents the unidirectional bias potential supplied by the series connected rectifier bridges 29 and 31 and the curve $E_g$ represents the resultant grid potential of the valve 15. As stated above, the rectifier bridges 29 and 31 are connected in opposition so that the unidirectional bias potential represented by the line $E_{dc}$ corresponds to the difference potential of these two rectifiers. Due to the constant potential device 33 connected across the rectifier 31, the potential supplied by this rectifier will remain substantially constant for normal variations of load current so that the difference potential appearing in the grid circuit of the valve 15 will vary substantially in accordance with the variations in the potential of the supply circuit 11. The connections are such that an increase in the potential of the supply circuit tends to increase positively the unidirectional bias potential $E_{dc}$. The phase displacement of the potential supplied by the winding 25 is so adjusted by means of the resistor 29 or the leakage reactance of the transformer 23, or both, that for the lowest potential normally encountered, that is, with the most negative grid bias $E_{dc}$ the curve $E_g$ will intersect the curve $E_a$ at the end of the positive half cycle of the curve $E_a$. Under normal operating conditions, however, the potential of the alternating current supply circuit 11 will have such a value that the difference potential of the rectifiers 29 and 31 will be represented by the line $E'_{dc}$ and the resultant grid potential by the curve $E'_g$. It will be understood, of course, that the operating conditions of electric valve 16 will be represented by identical curves displaced in phase 180 electrical degrees. Under these conditions, it will be noted that electric valves 15 and 16 are each conductive for an angle $b$ during the final portion of their respective half cycles of positive anode potential, and thus short circuit the load device 10 during these intervals so that, under normal operating conditions, the average load current will depend upon the average area of the curve $E_a$ for the interval $(180-b)°$. In case the potential of the supply circuit 11 tends to rise above normal so as to tend to increase the load current supplied to the device 10, the potential supplied by the windings 18 and 19 and their associated rectifiers 29 and 31 will increase so as to decrease the negative bias potential $E_{dc}$, which has the effect of rendering each of the valves 15 and 16 conductive at earlier points in their respective half cycles of positive anode potential, thus short circuiting the load device 10 for a greater interval of each half cycle to compensate for the increase in potential of the supply circuit 11. In case the potential of the supply circuit falls below normal, the reverse operation will take place.

In case the load circuit 10 becomes accidentally interrupted, the potentials supplied by the windings 21 and 22 and 24 and 25 will fall to zero and the only remaining potentials will be those supplied by the windings 18 and 19 which are rectified by the bridge circuits 28 and 29 respectively. These potentials are positive so that both of electric valves 15 and 16 will be made fully conductive and the load circuit will be completely short circuited. Thus the load circuit and its associated devices will be protected from disruptive voltages occasioned by open circuits. It will be noted, however, that a short circuit upon the output diagonal of the monocyclic square does not constitute a short circuit of the supply circuit 11, but on the contrary is analogous to an open circuit. The power flowing in the apparatus will be only that required to supply the losses in the monocyclic square and its associated valves.

While we have described what we at present consider the preferred embodiment of our invention, it will be obvious to those skilled in the art that various changes and modifications may be made without departing from our invention and we, therefore, aim in the appended claims to cover all such changes and modifications as fall within the true spirit and scope of our invention.

What we claim as new and desire to secure by Letters Patent of the United States is:

1. In combination, a substantially constant potential alternating current supply circuit, a constant current load circuit, means for transmitting energy therebetween, an electric valve connected to short circuit said load circuit, and means for rendering said valve conductive when the load current drops below a predetermined value.

2. In combination, an alternating current supply circuit subject to normal potential variations, a substantially constant current load circuit, means for transmitting energy therebetween, an electric valve connected to bypass energy from said load circuit, and means responsive to said potential variations for controlling said valve.

3. In combination, an alternating current supply circuit subject to normal potential variations, a constant current load circuit, a monocyclic square for transmitting energy therebetween, an electric valve connected to bypass energy from said load circuit, means responsive to said potential variations for controlling said valve to compensate therefor, and other means for rendering said valve fully conductive when the load current drops below a predetermined value.

4. In combination, an alternating current supply circuit, a constant current load circuit, a monocyclic square for transmitting energy therebetween, an electric valve connected to short circuit said load circuit, means responsive to the potential of said supply circuit tending to render said valve conductive, and means responsive to said load current tending to render said valve nonconductive, whereby said load circuit is short circuited when the load current drops below a predetermined value.

5. In combination, an alternating current supply circuit, a constant current load circuit, a monocyclic square for transmitting energy therebetween, an electric valve connected to short circuit said load circuit, and a grid circuit for said valve including a source of positive bias potential and a source of alternating potential variable in accordance with the load current and displaced in phase from the load potential by approximately 180 electrical degrees, whereby said load circuit is short circuited when the load current drops below a predetermined value.

6. In combination, an alternating current supply circuit, a constant current load circuit, a monocyclic square for transmitting energy therebetween, an electric valve connected to short circuit said load circuit, and a grid circuit for said valve including a substantially constant positive bias potential and a negative bias potential greater than said positive bias and substantially constant for normal values of load current but decreasing with said load current below predetermined values thereof, whereby said load circuit is short circuited when the load current drops below a predetermined value.

7. In combination, an alternating current supply circuit subject to normal potential variations, a constant current load circuit, a monocyclic square for transmitting energy therebetween, an electric valve connected to bypass energy from said load circuit, and means for rendering said valve conductive for a portion of each cycle dependent upon the variation of said supply potential from normal, whereby said load current is maintained constant.

8. In combination, an alternating current supply circuit subject to normal potential variations, a constant current load circuit, a monocyclic square for transmitting energy therebetween, an electric valve connected to bypass energy from said load circuit, a grid circuit for said valve including a source of positive bias potential variable in accordance with said potential variations and a source of alternating potential variable in accordance with the load current and displaced in phase with respect to the potential of said load circuit by approximately 180 electrical degrees.

9. In combination, an alternating current supply circuit, subject to normal potential variations, a constant current load circuit, a monocyclic square for transmitting energy therebetween, an electric valve connected to bypass energy from said load circuit, rectifying means energized from said supply circuit, means for deriving a potential from said load circuit substantially constant in magnitude above a predetermined load current but variable in accordance therewith below said value, means for rectifying said last mentioned potential, means for deriving an alternating potential variable in accordance with said load current and displaced in phase therefrom by substantially 180 electrical degrees, and a grid circuit for said valve including said rectified potentials and said derived alternating potential.

In witness whereof, we have hereunto set our hands.

HERBERT D. BROWN.
CAMIL A. SABBAH.